(12) United States Patent
Ochs et al.

(10) Patent No.: US 7,414,805 B1
(45) Date of Patent: Aug. 19, 2008

(54) METHOD FOR INTELLIGENT TAPE DRIVE SUBSYSTEM CONTROL AND MONITORING IN A TAPE LIBRARY

(75) Inventors: Steven Ochs, Louisville, CO (US); Antonio Borrego, Superior, CO (US); Don Wait, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 660 days.

(21) Appl. No.: 10/696,321

(22) Filed: Oct. 29, 2003

(51) Int. Cl.
*G11B 17/00* (2006.01)
(52) U.S. Cl. ...................................... 360/69
(58) Field of Classification Search ............... None
See application file for complete search history.

(56) References Cited

U.S. PATENT DOCUMENTS 5,769,705 A * 6/1998 O'Callaghan et al. ....... 454/184
2004/0056568 A1* 3/2004 Carlson et al. ........... 312/223.1
2005/0052772 A1* 3/2005 Barbian et al. ................ 360/69
2005/0057847 A1* 3/2005 Armagost et al. ............. 360/92

* cited by examiner

Primary Examiner—Jason C Olson
(74) Attorney, Agent, or Firm—Brooks Kushman P.C.

(57) ABSTRACT

A method for adding intelligence into the tape drive subsystems of a media storage library. The present invention improves overall system availability by enhancing existing control, monitoring, and diagnostic functionalities. As a result of inserting intelligence into the drive trays, certain control and monitoring functions traditionally performed by the main library controller may be performed locally at the drive trays. Since certain functions are performed locally at the drive trays, fewer connections are required between the tape drive trays and the main library controller. Also, the main library controller's performance is not degraded as the number of tape drives increases. The present invention also provides flexibility to the storage system since new features and functions may be added to the drive tray subsystem without the need to modify the base library cabling infrastructure.

11 Claims, 3 Drawing Sheets

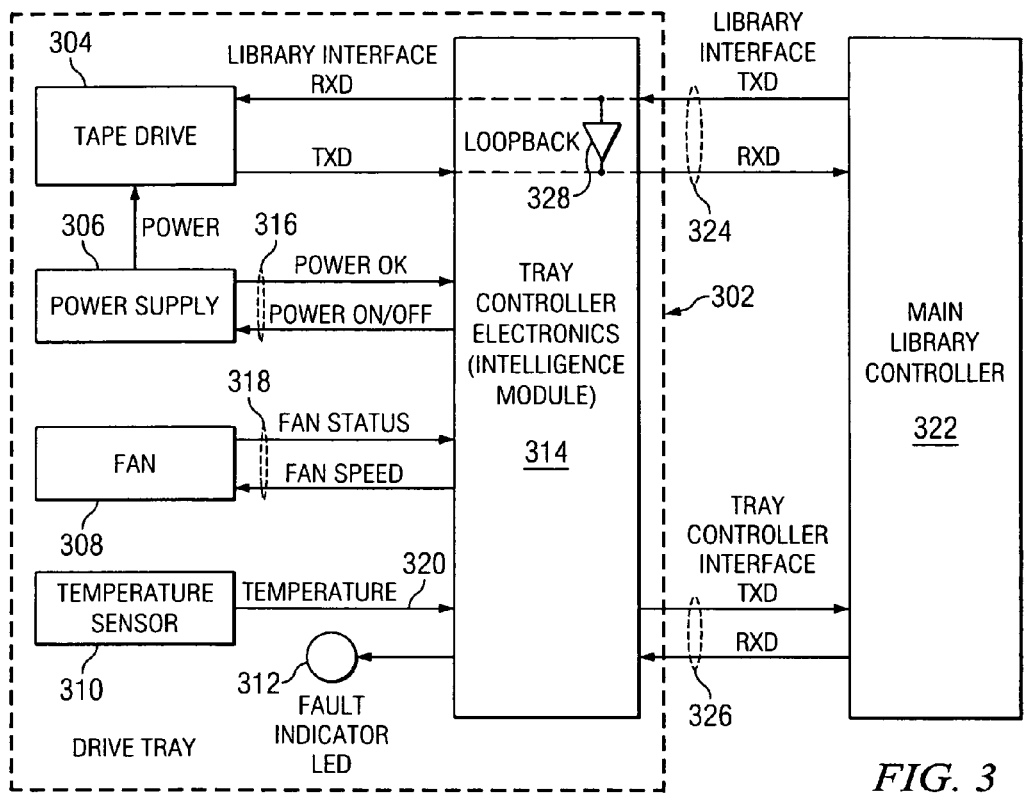
FIG. 3
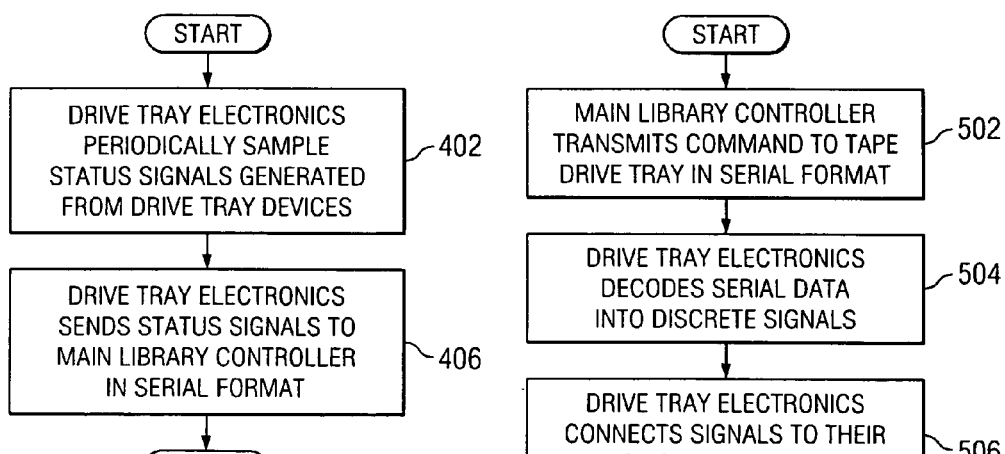
FIG. 4
FIG. 5

METHOD FOR INTELLIGENT TAPE DRIVE SUBSYSTEM CONTROL AND MONITORING IN A TAPE LIBRARY

BACKGROUND OF THE INVENTION

1. Field of the Invention

The present invention relates to an improved library storage system. More particularly, the present invention relates to a system for adding intelligence to the tape drive tray subassembly in order to provide better control, monitoring, and diagnostics of a library's subsystems.

2. Background of the Invention

Existing automated storage libraries are capable of storing and retrieving large quantities of information stored on media cartridges. This capability is accomplished by the use of a large number of drive trays, each of which houses a tape drive, that are installed within a library frame. Electrical connections cabled between the tape drive trays and the main library controller or processor provide the main library controller with the means to control and monitor tape drive tray functions.

Designing the interface to monitor and control the tape drive tray subassembly can be a complex endeavor in systems having large enterprise libraries. Currently, customer demands for high availability in the enterprise tape library market require more monitoring of the library's subsystems. As the enterprise market targets larger and larger libraries, designing the electrical and mechanical infrastructure needed to control and monitor these subsystems becomes a challenging issue.

A conventional tape drive array includes a number of tape drive trays installed in a tape library frame. FIG. 1 depicts an example of a large-scale tape library system which supports 64 tape drive trays. Tape drive trays 102 are grouped into tape drive arrays 104. Each tape drive tray 102 is connected to the main library controller 106. Each connection line 108 as shown in FIG. 1 represents multiple signals. Electrical connections between main library controller 106 and tape drive trays 102 provide main library controller 106 with the means to control and monitor tape drive tray functions.

In view of current demands for high availability in the enterprise tape market, conventional tape drive systems contain several disadvantages. One such disadvantage is that as the number of supported tape drive trays increases, more of the library's main controller's bandwidth is required to monitor and control the tape drive trays. For example, the library system as shown in FIG. 1 may require that fans, temperature, and power supply status, as well as software controlled power-on, be monitored for each of the 64 tape drive trays.

Another challenge encountered in designing large-scale libraries is that as the number of tape drives increases, the number of signals between the main library controller and the tape drive array becomes extremely large. This is an important issue for tape subsystems that support a large number of tape drives (e.g., up to 64 tape drives). Since each tape drive tray interface typically contains fifteen signals, almost one thousand signal connections to the main library controller are required if each drive tray signal is connected directly to the main controller. Physically connecting and routing all of these signals are difficult and costly.

Furthermore, current methods for adding features to a conventional drive tray system typically require adding new signals to the drive tray cabling. As a result, it may be difficult to add features to the drive tray at a later point in time. For systems designed for high availability, adding new signals to the drive tray cabling is problematic because the library must be shut down to make the necessary changes.

Consequently, it would be advantageous to have a system for providing local control and monitoring of a tape drive's subsystems in order to overcome the electrical and mechanical issues encountered in high availability enterprise libraries in the prior art. It would further be advantageous to have a system that provides flexibility for the addition of future features.

SUMMARY OF THE INVENTION

The present invention provides a system for adding intelligence to the tape drive subsystems of a media storage library. The capabilities added to the tape drive subsystems improve overall system availability by enhancing existing control, monitoring, and diagnostic functionalities. As a result of inserting an intelligence module into the drive trays, certain control and monitoring functions traditionally performed by the main library controller may be performed locally at the drive trays. For example, the tape drive tray may monitor the environmental status (e.g. fan speed, temperature, etc.), of the library subsystems.

The present invention also provides flexibility to the storage system, for as tape drive technology changes, new features and functions may be added to the drive tray subsystem without the need to modify the base library cabling infrastructure. This flexibility is desirable in order to protect the customer from library obsolescence.

Furthermore, the present invention may be used to improve tape drive tray diagnostics. Adding intelligence to the drive tray provides for diagnostic features such as, for example, fan speed control, fan operation monitoring, temperature measurement, power supply monitoring, cable integrity validation, fault reporting, to be performed locally at the drive tray.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a block diagram of the drive tray electronics in accordance with a preferred embodiment of the present invention;

FIG. 4 is a flowchart illustrating an exemplary method of employing intelligence added to the drive trays in accordance with a preferred embodiment of the present invention; and FIG. 5 is a flowchart illustrating an alternative method of employing intelligence added to the drive trays in accordance with a preferred embodiment of the present invention.

DETAILED DESCRIPTION OF THE PREFERRED EMBODIMENT

The present invention solves the problems present in the prior art by adding intelligence to the tape drive subsystems. Local intelligence is implemented in the tape drive trays to allow the drive trays to control and monitor particular functions within the library subsystems. Possible functions provided by the drive tray include monitoring the tape drive power supply and controlling the tape drive power on/off setting, monitoring the temperature, monitoring and controlling the air flow by managing the fan speed, and service features. In the preferred embodiment, the present invention is implemented in a drive tray subsystem within a single library storage frame.

Figure 2:
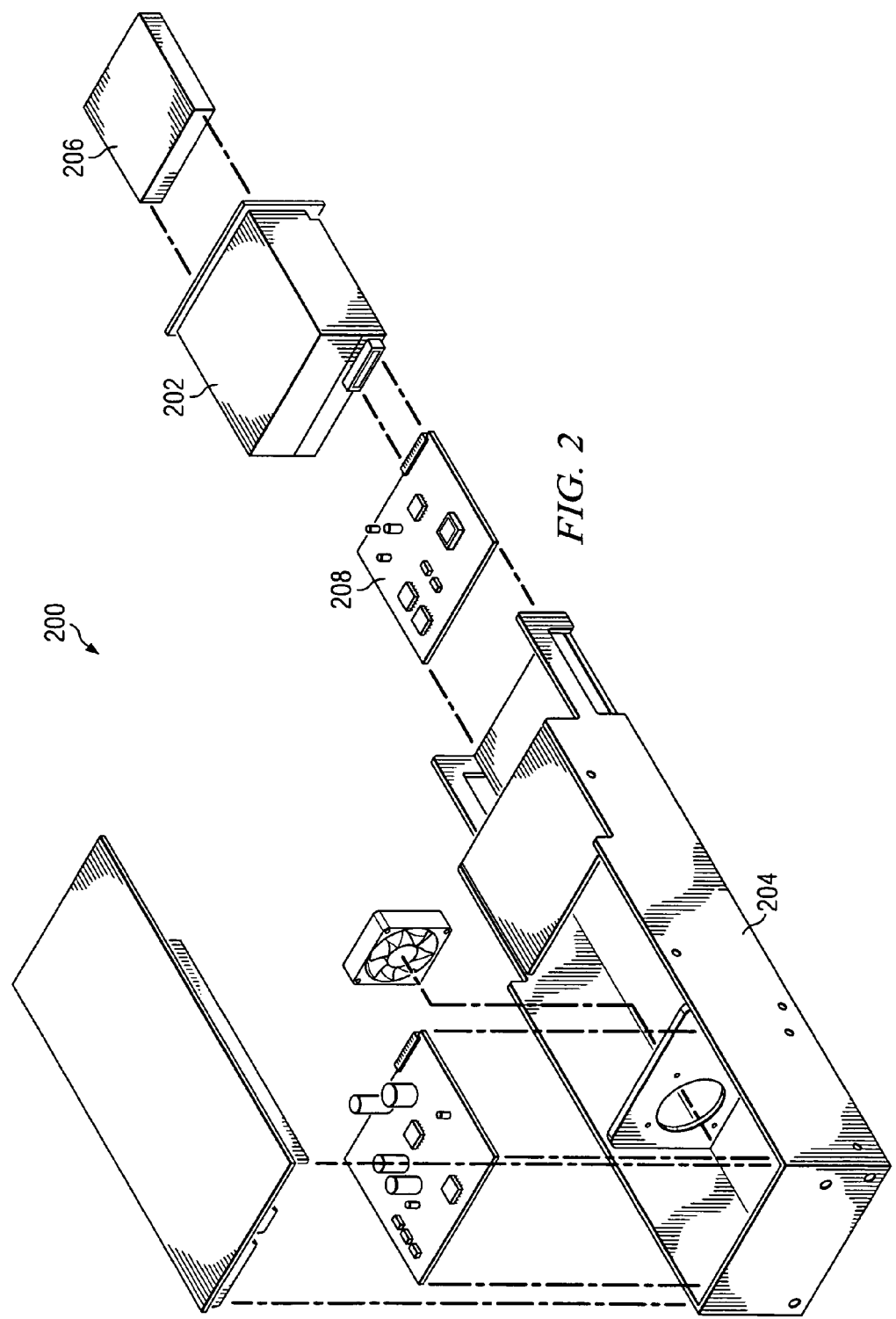
FIG. 2 is a perspective view of a tape drive tray assembly consistent with implementing a preferred embodiment of the present invention.

FIG. 2 is a perspective view of a tape drive tray assembly consistent with implementing a preferred embodiment of the present invention. Tape drive tray 200 is a library subsystem comprising a tape drive 202 mounted in frame 204. Other items may also be included within tape drive tray assembly 200, such as a power supply, fan assembly, indicator lights, and temperature sensor. Frame 204 may be any general support structure for mounting the components of the tape drive in an operative relationship. Tape drive tray controller electronics 208 are mounted into frame 204 to provide intelligence to tape drive tray 200. Tape cartridge 206 may be automatically drawn into tape drive 202 when inserted, and removed by sending an eject command over the tape drive's library interface.

As stated previously, the present invention adds intelligence to the tape drive subsystems. An advantage of adding electronics to the drive trays to locally perform particular functions normally reserved for the library's main controller is that the library's main controller will subsequently require less bandwidth for these functions. This bandwidth requirement is an important issue for tape subsystems that support a large number of tape drives. The capabilities added to the drive tray help to provide better control, monitoring, and diagnostics, thus improving overall system availability.

In addition, a serial link may be used to communicate between the drive trays and the main library controller. Passing data serially rather than using separate wires for each function minimizes the number of required signal lines. An additional benefit to using a serial link is that new features can be added to the drive tray without additional cabling to the main library controller.

The present invention provides another advantage over the prior art for as the library's main controller requires less bandwidth to perform certain functions, fewer connections are required between the drive tray and the main library controller. Consequently, even if the size of the tape drive array increases, the performance of the main library controller will not be degraded.

Figure 1:
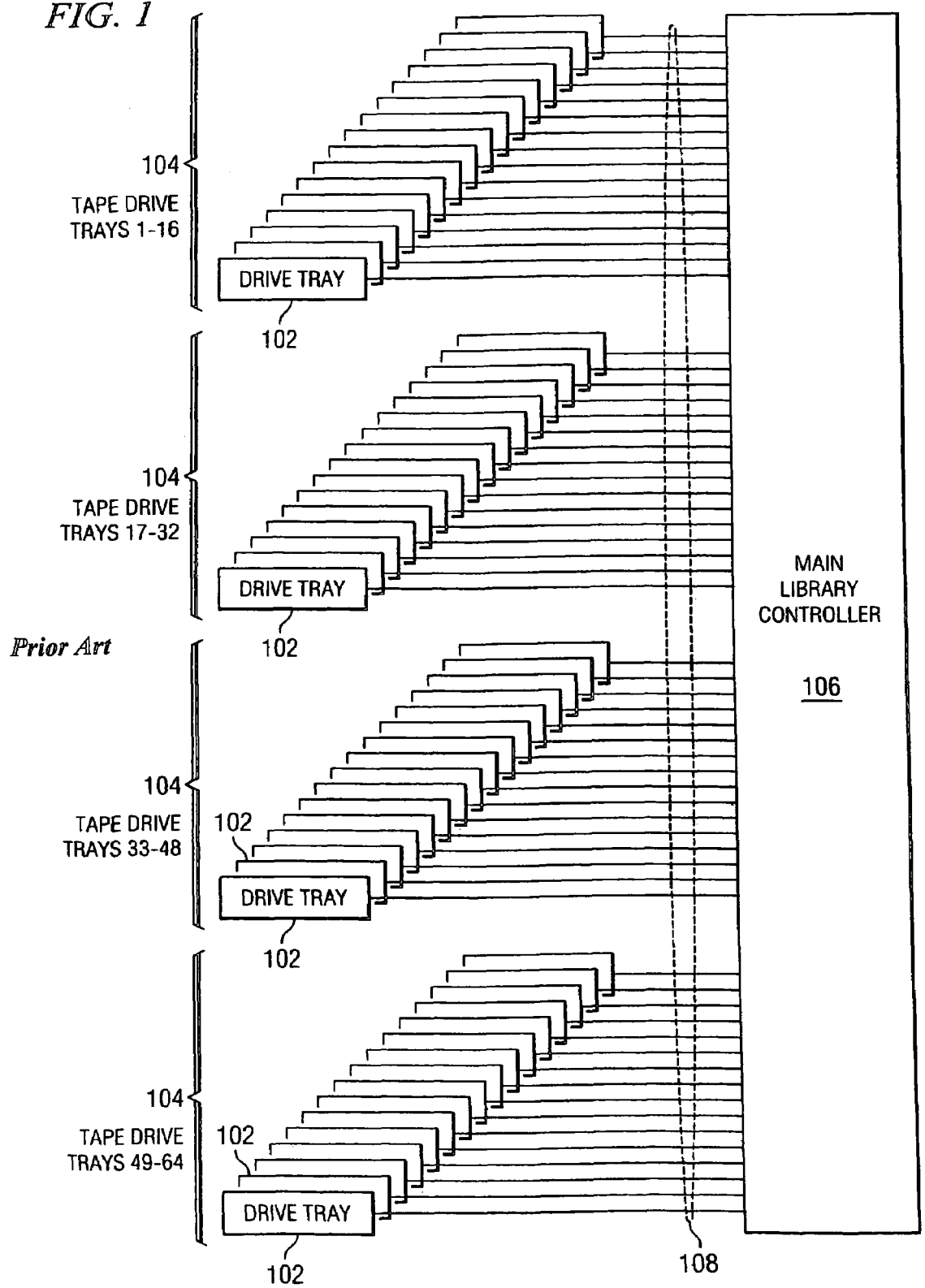
FIG. 1 depicts a known tape drive array.

Referring now to FIG. 3, a block diagram of the drive tray electronics for a single drive tray in accordance with a preferred embodiment of the present invention is shown. This single drive tray illustrated in FIG. 3 may be, for example, one of the drive trays shown in drive tray array 104 in FIG. 1.

The tape drive subassembly is commonly referred to as a drive tray. Drive tray 302 contains various items, such as, for example, a tape drive 304, power supply 306, fan 308, temperature sensor 310, and indicator lights for power and fault status 312. Tray controller electronics 314 are inserted into the drive tray 302. Tray controller electronics 314 periodically samples status signals generated from devices within drive tray 302. Such signals may include tape drive power okay 316, fan status 318, and temperature data 320. Tray controller electronics 314 sends the status signals to main library controller 322 through tray controller interface 326. The status signals may be sent in a serial format.

Main library controller 322 may also transmit control information through tray controller interface 326 to tray controller electronics 314. The control information is transmitted to tray controller electronics 314 in a serial fashion. Tray controller electronics 314 decodes the serial data and then drives the discrete signals of the specific interface being addressed. For example, if the transmitted data includes control information such as tape drive power on/off, tray controller electronics 314 drives the power supply 306 on/off control input to the state specified in the command. Likewise, if the transmitted data includes control information such as fan speed, tray controller electronics 314 drives the fan speed input of the fan 308 to the state specified in the command.

It should be noted that two separate serial interfaces are shown in FIG. 3, one for the tape drive's library interface 324 and another for the tray controller electronics 326. It should be noted that it is possible to combine the two interfaces into a single one to further reduce cabling. A further improvement would be to utilize wireless communications means such as radio frequency (RF) or infrared (IR). In addition, one of ordinary skill in the art would understand that the serial interface used for tray controller electronics interface 326 may include any type of serial interface, such as, for example, RS-232, RS-422, RS-485, Ethernet, USB, P1394 (FireWire), or Fibre Channel. Furthermore, various transmission mediums such as, for example, wired channels (cable), optical fiber, and radio frequency (RF) may be used to transfer information through tray controller electronics interface 326. One of ordinary skill in the art would understand that the present invention includes, but is not limited to, the interface types and transmission mediums listed above.

FIG. 3 illustrates how adding intelligence to the drive tray can also be used to improve tape drive tray diagnostics. For example, implementing a loopback mode 328 for the tape drive's library interface port allows the main controller to verify cable integrity. During normal operation, the tray controller electronics 314 transparently passes library interface data between tape drive 304 and main library controller 322. In response to main library controller 322 sending a command to tray controller 314, the library interface port may be placed in loopback mode 328. Data transmitted to drive tray 302 by main library controller 314 is routed or "looped back" to main library controller 314 receive data. Consequently, main library controller 314 is able to verify the integrity of the signal lines to drive tray 302.

Turning now to FIG. 4, a flowchart illustrating an exemplary method of employing the intelligence added to the drive trays in accordance with a preferred embodiment of the present invention is shown. Once electronics are added to the drive trays, drive tray electronics periodically sample status signals generated from devices within drive tray (step 402). Such signals may include tape drive power okay, fan status, and temperature data. The tape drive tray electronics sends the status information to main library controller in a serial format (step 406).

FIG. 5 is a flowchart illustrating an alternative method of employing the intelligence added to the drive trays in accordance with a preferred embodiment of the present invention. The main library controller may send control information to the drive tray electronics. The process begins with the main library controller transmitting a command to the tape drive tray in a serial manner (step 502). Upon receipt of the command, drive tray electronics decodes the serial data (step 504), and drives discrete signal lines to their states as specified in the command (step 506). For example, if the transmitted data includes control information such as tape drive power on/off, the drive tray electronics drives the on/off input of the power supply to the on or off state specified in the command. Likewise, if the transmitted data includes control information such as fan speed, the drive tray electronics drives the fan speed input to the state specified in the command.

Thus, the present invention provides a system for adding intelligence into tape drive subsystems. The advantages of the present invention should be apparent in view of the detailed description provided above. The capabilities added to the drive tray help to provide better control, monitoring, and diagnostics, thus improving overall system availability. As a result of adding drive tray electronics, fewer connections are required between the tape drive and the main library controller. In addition, the main library controller's performance is not degraded as the number of tape drives increases.

The present invention also provides flexibility to the storage system, for as tape drive technology changes, new features and functions may be added to the drive tray subsystem without the need to modify the base library cabling infrastructure. This flexibility is desirable in order to protect the customer from library obsolescence. Furthermore, the present invention may be used to improve tape drive tray diagnostics. Adding intelligence to the drive tray provides for diagnostic features such as fan speed control, fan operation monitoring, temperature measurement, power supply monitoring, cable integrity validation, fault reporting, to be performed locally at the drive tray.

The description of the present invention has been presented for purposes of illustration and description, but is not intended to be exhaustive or limited to the invention in the form disclosed. Many modifications and variations will be apparent to those of ordinary skill in the art. For example, although the depicted examples employ the use of a power supply, fan, temperature sensor, and fault indicator light, other features may be used depending upon the type of monitoring desired.

Furthermore, use of the present invention may be expanded beyond the applications already listed above. For example, an intelligent tape drive tray controller could be used to monitor the tape drive library interface port and provide diagnostic results to the main library controller. In addition, operation of the tape drive may be monitored. For instance, the health of the tape drive may be checked periodically and necessary updates to the drive code may be provided to the tape drive.

Additionally, the intelligent tape drive tray controller may be used to facilitate library interface and data path protocol conversions, wherein the drive tray controller handles control of the interaction among the functional units. Furthermore, the present invention may be used to electromechanically control various features within the library system, such as controlling the solenoid tray lock, media enter & eject assist, and other features present in the library system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape library storage system, comprising:
   at least one tape drive tray having a tape drive, power supply, fan, fault indicator light, and temperature sensor mounted therein;
   an intelligence module stationary within the at least one tape drive tray, said intelligence module having electronics to control and monitor tape drive tray functions in the storage library, including electronics to control and monitor the tape drive, power supply, fan, temperature sensor, and fault indicator light;
   a main library controller interfaced to the intelligence module, wherein the intelligence module sends tape drive tray function data to the main library controller for use by the main library controller in commanding operations of the at least one tape drive tray, wherein, in response to receipt of the tape drive tray function data, the main library controller transmits a command to the intelligence module that the intelligence module decodes for use in controlling the at least one tape drive tray, including controlling the tape drive, power supply, fan, and fault indicator light.

2. The system in claim 1, wherein the intelligence module interface includes a tape transport interface port.

3. The system in claim 1, wherein the tape drive tray function data is sent via a wireless connection.

4. The system in claim 3, wherein the wireless connection includes at least one of a radio frequency or infrared transmission.

5. The system in claim 1, wherein the at least one tape drive tray includes a loopback configured to loop the command back to the main library controller, wherein the command loops back to the main library controller for use in verifying integrity of communication lines used by the main library controller to communicate with the at least one tape drive.

6. The system in claim 5, wherein the main library controller transmits the command to the intelligence module in a serial format.

7. The system in claim 6, wherein the intelligence module decodes the serially formatted command into discrete signals corresponding to a specific tape drive tray interface.

8. The system in claim 1, wherein positive or negative acknowledgment of the commands is sent back to the main library controller after the commands are received by the intelligence module.

9. The system in claim 1, wherein the intelligence module sends tape drive tray function information to the main library controller in a serial format.

10. The system in claim 1, wherein the tape drive tray function data is gathered by periodically sampling status signals from the tape drive tray.

11. A method of controlling devices located within a tape drive tray, comprising:
    transmitting control data from a main controller to the tape drive tray in a serial format;
    receiving the control data at the tape drive tray, wherein a stationary intelligence module within the tape drive tray decodes the control data;
    using the stationary intelligence module to drive discrete signal lines to a state as specified in the control data;
    periodically, with a loopback feature included within the tape drive tray, looping at least a portion of the control data back to the main library controller; and
    the main library controller to verifying integrity of at least one communication line used by the main library controller to communicate with the at least one tape drive based on the looped backed portion of the control data.

* * * * *